Nov. 17, 1953    H. A. SCHNEIDER    2,659,337
APPARATUS FOR SPRAYING ATTENUATION MATERIAL
ONTO TRAVELING WAVE TUBE HELICES
Filed Oct. 6, 1952    5 Sheets-Sheet 1

INVENTOR
H. A. SCHNEIDER
BY
ATTORNEY

Nov. 17, 1953

H. A. SCHNEIDER 2,659,337

APPARATUS FOR SPRAYING ATTENUATION MATERIAL
ONTO TRAVELING WAVE TUBE HELICES

Filed Oct. 6, 1952

INVENTOR
H. A. SCHNEIDER
BY
ATTORNEY

Nov. 17, 1953  H. A. SCHNEIDER  2,659,337
APPARATUS FOR SPRAYING ATTENUATION MATERIAL
ONTO TRAVELING WAVE TUBE HELICES
Filed Oct. 6, 1952  5 Sheets-Sheet 3

FIG.5

| JACK NO. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | ⊘ | ⊘ | ○ | ○ | ○ | ○ | ○ | ○ | ○ | ○ | ○ | ○ | ○ | ○ | ○ | ● | ○ | ○ | ○ | ○ |
| 20 | ○ | ○ | ○ | ○ | ○ | ○ | ○ | ○ | ● | ○ | ○ | ○ | ○ | ○ | ○ | ○ | ○ | ○ | ○ | ○ |
| 40 | ● | ○ | ○ | ○ | ○ | ○ | ○ | ○ | ○ | ○ | ○ | ● | ○ | ○ | ○ | ○ | ○ | ○ | ○ | ○ |
| 60 | ○ | ● | ○ | ○ | ○ | ○ | ○ | ○ | ○ | ○ | ● | ○ | ○ | ○ | ○ | ○ | ○ | ○ | ● | ○ |
| 80 | ○ | ○ | ○ | ○ | ○ | ● | ○ | ○ | ○ | ○ | ○ | ● | ○ | ○ | ○ | ○ | ● | ○ | ○ | ○ |
| 100 | ○ | ● | ○ | ○ | ○ | ● | ○ | ○ | ● | ○ | ○ | ○ | ● | ○ | ○ | ● | ○ | ○ | ○ | ● |
| 120 | ○ | ○ | ● | ○ | ○ | ● | ○ | ● | ○ | ● | ○ | ● | ○ | ● | ○ | ● | ● | ● | ● | ● |
| 140 | ● | ● | ● | ● | ● | ● | ⊶ | ○ | ○ | ○ | ○ | ○ | ○ | ○ | ○ | ○ | ○ | ○ | ○ | ○ |
| 160 | ● | ○ | ○ | ○ | ○ | ○ | ○ | ○ | ○ | ○ | ○ | ○ | ○ | ○ | ○ | ○ | ○ | ○ | ○ | ○ |
| 180 | ○ | ○ | ○ | ○ | ○ | ○ | ○ | ○ | ○ | ○ | ○ | ○ | ○ | ○ | ○ | ○ | ○ | ○ | ○ | ○ |

SYMBOLS

○  UNPLUGGED JACK
⊘  JACK AND DUMMY PLUG
●  JACK AND SHORTING PLUG 64
⊶  JACK, SPECIAL PLUG 68 AND CORD
    TO STOP RELAY 42

INVENTOR
H. A. SCHNEIDER
BY
ATTORNEY

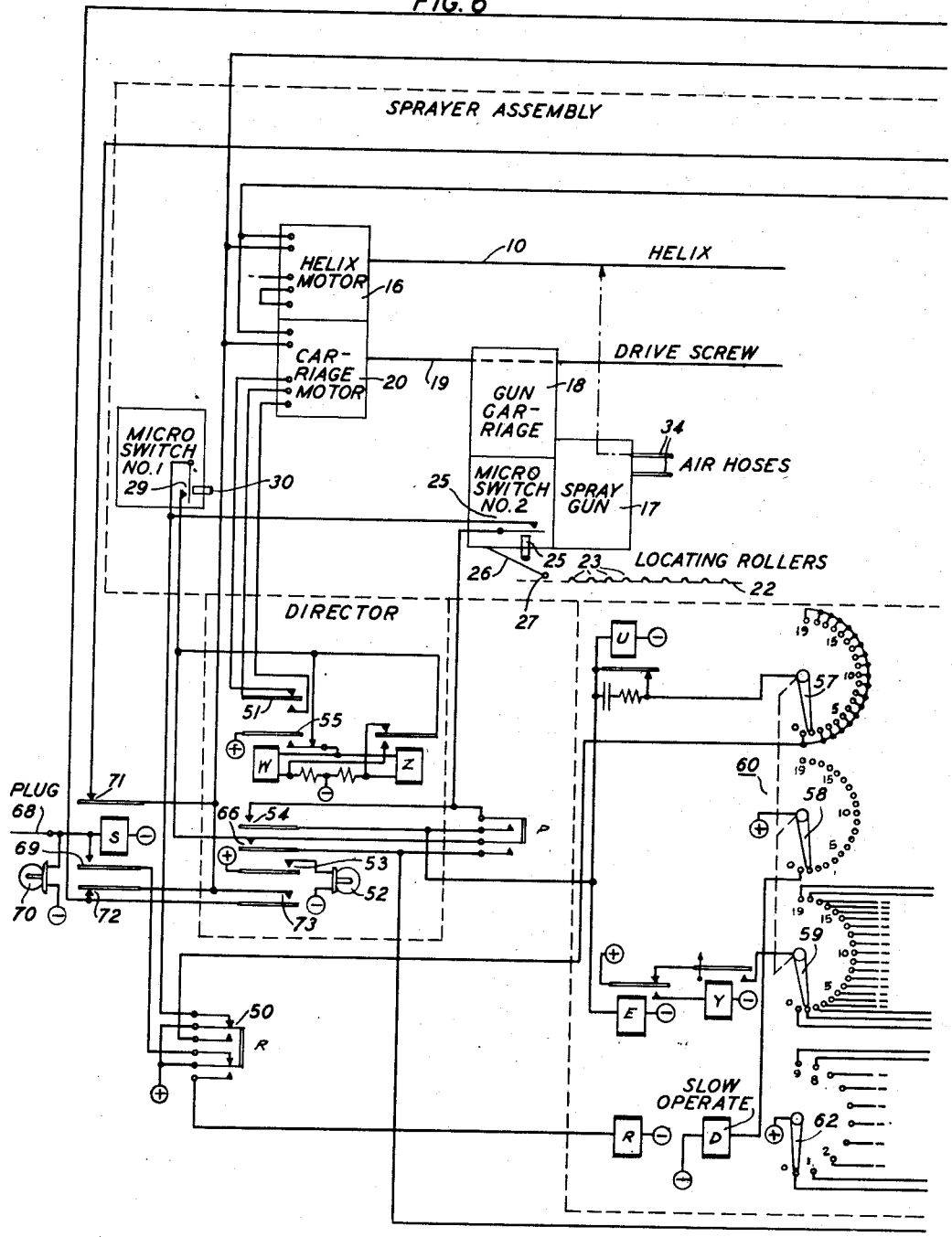

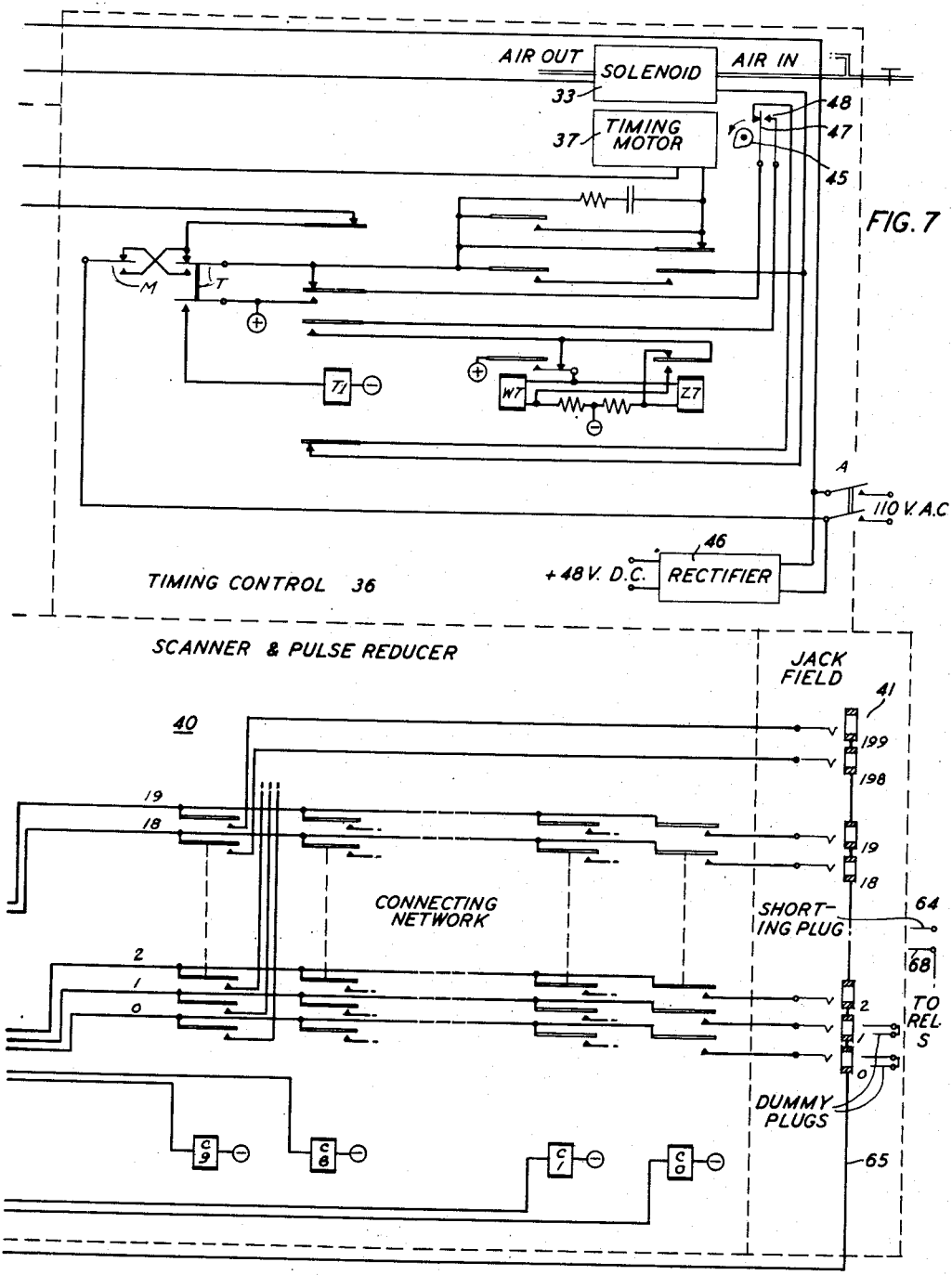

Patented Nov. 17, 1953

2,659,337

UNITED STATES PATENT OFFICE 2,659,337

APPARATUS FOR SPRAYING ATTENUATION MATERIAL ONTO TRAVELING WAVE TUBE HELICES

Herbert A. Schneider, New York, N. Y., assignor to Bell Telephone Laboratories, Incorporated, New York, N. Y., a corporation of New York Application October 6, 1952, Serial No. 313,229

15 Claims. (Cl. 118—7)

This invention relates to apparatus for spraying attenuation onto traveling wave tube helices and more particularly to such apparatus for automatically controlling the spray pattern.

Attenuation or loss is generally applied to the interaction circuits of traveling wave tubes to prevent components of the radio frequency signal wave from being reflected back and forth along the circuit thereby to cause tube instability. The attenuation pattern, i. e., the variation in the amount of attenuation along the traveling wave tube circuit, will depend on the particular characteristics it is desired to optimize. Thus one particular variation of attenuation or pattern will afford maximum tube gain for a given helix length consistent with maximum power and efficiency, while another pattern will afford maximum stability and freedom from long-line impedance effects consistent with maximum power and efficiency. Two such attenuation patterns and the advantages attainable thereby are described in application Serial No. 168,202, filed June 15, 1950, of C. C. Cutler.

One particular form of delay line interaction circuit that has been much utilized in traveling wave tubes comprises a helical conductor or helix, and it has been found advantageous to apply the attenuation to this helix in the form of a colloidal suspension of graphite in water, known commercially as Aquadag. The thickness of the coating of graphite on the helix at any point determines the attenuation or loss at that point. Considerable difficulty, however, has been encountered in accurately controlling the variations in the thickness of this graphite coating along the helix. Generally the helix has been positioned in a lathe-like mount where it can be rotated and sprayed by a spray gun which may travel along the helix on a carriage adjacent thereto. The travel of the spray gun is determined by an operator who reverses the direction of the spray gun carriage periodically until the desired thicknesses of graphite have been deposited on various portions of the helix.

It is a general object of this invention to enable the spraying of the attenuation onto the helix to be entirely automatic in accordance with a prescribed pattern.

In one specific embodiment of this invention, the helix is mounted in a lathe or like machine having a line of spaced rollers adjacent thereto, the rollers defining spaced distances along the helix. A spray gun is carried by a carriage mounted for travel along the helix. The spray gun will trace a spiral pattern on the helix, but the resultant coating is even as the lateral motion of the carriage and spray gun is slow compared to the helix rotation. A microswitch is carried by the spray gun carriage and is actuated by an arm having a wheel at its far end traveling along the line of spaced rollers so as to cause a closure of the microswitch as each roller is traversed by the wheel. The closings of the microswitch are compared, by a scanning circuit, with a pattern memory priorly set up in the apparatus, as in the form of a jack field. When the closing of the switch occurs at a position corresponding to a change in pattern in the pattern memory, the apparatus causes motion of the spray gun carriage to be reversed. In this way the spray gun travels back and forth along the helix under the control of the pattern priorly set up in the memory of the apparatus until the entire pattern to the desired thicknesses is deposited on the helix.

It is therefore one feature of this invention that apparatus for spraying an attenuation pattern on a helix of a traveling wave tube be able to keep track of the position of the spray gun with respect to its lateral motion along the helix and to scan a predetermined memory pattern supplied to the apparatus to compare the gun position with that pattern.

It is a further feature of this invention that the gun be carried by a carriage mounted for lateral motion adjacent the helix and that the carriage reverse its direction under control of the predetermined memory pattern at specific points in its travel along the helix.

A still further feature of the invention is that a track be positioned adjacent the helix and parallel to the axis thereof, the track having rollers or ridges cooperating with an arm depending from the carriage to close a switch carried by the carriage once for each passage of the arm over the rollers and that the closures of that switch be counted by the apparatus so that the position of the gun at any instant may be compared with the predetermined memory pattern in the apparatus.

A complete understanding of this invention and of these and various other features thereof may be gained from consideration of the following detailed description and the accompanying drawing, in which:

Fig. 1 is a side view of the helix of a traveling wave tube and the support rods therefor;

Fig. 2 is a graph of one desirable attenuation pattern for the helix of Fig. 1, the graph being aligned with the helix of Fig. 1;

Fig. 3 is a graph of the stepped deposits of a spray gun controlled by apparatus in accordance with this invention, the stepped deposits approximating the attenuation pattern of Fig. 2. Fig. 3 is also aligned on the sheet with the helix of Fig. 1;

Fig. 4 is a block diagram representation of one specific embodiment of attenuation spraying apparatus in accordance with this invention;

Fig. 5 is a representation of a jack field that may be employed in the apparatus of Fig. 4 as the pattern memory, the jack field being set up for the attenuation pattern of Figs. 2 and 3; and Figs. 6 and 7 are schematic representations of the specific embodiment of this invention depicted in Fig. 4.

Turning now to the drawing, Fig. 1 shows a typical helix 10 supported by helix support rods 11 for incorporation into a traveling wave tube. Figs. 2 and 3, which are aligned on the drawing with the helix of Fig. 1 to facilitate an appreciation of the position of the applied attenuation coating, illustrates one particular attenuation or loss pattern that may be applied to the helix 10. The pattern 12 of Fig. 2 represents the relative thickness of the attenuating material, which may advantageously be Aquadag, along the length of the helix 10 as measured by half-inch units, for reasons further described below. In this particular attenuation pattern there is a short lossless portion of helix adjacent the input end to allow for an initial interaction between the signal wave on the helix and the electron beam to transfer the signal to the beam. A sharp maximum portion of attenuating material follows this lossless portion to attenuate completely the signal on the helix, the signal being carried past this maximum portion by the electron beam. In this manner the input and output ends of the helix are isolated. The thickness of the material decreases sharply from this maximum point until a point near the helix output end after which point the helix is again lossless. The helix is loss free at the output end in order to achieve maximum efficiency, the length of the loss free section being determined by the helix-electron beam coupling parameter of the tube. This particular loss pattern may advantageously be utilized when it is desired that the traveling wave tube be free of long-line impedance effects while maintaining high stability and efficiency. While one particular pattern has been shown, and the operation of my novel apparatus will be described with reference to this attenuation pattern, it is to be understood that any other desired pattern could be produced by my apparatus and that this pattern is referred to merely for purposes of exposition and because it is one pattern that has found extensive use in traveling wave tubes.

In Fig. 3 the pattern of Fig. 2 is again shown but the curve 13 is stepped. As discussed further below my novel apparatus deposits a specific amount of attenuation, identified as a spray unit, on the helix 10 as it travels past each of the distance units along the helix. As can be seen from the stepped curve 13 which approximates the desired pattern 12, the smaller the unit spray is made in both length along the helix and the amount deposited, the smoother the pattern. This, however, also requires a larger number of passes of the spray gun back and forth and a much longer spray operation. A satisfactory balance between these different variables is therefore attained.

The stepped pattern 13 is produced by moving a spray gun back and forth along the helix while the helix is being rotated, the points of reversals of the direction of the spray gun motion being dependent on the desired pattern. Turning now to Fig. 4 there is shown a block diagram of the basic components of my novel spray apparatus which can be readily understood by an explanation of the operation of the apparatus. The helix 10 is supported, as by a mandrel, not shown, so that it may be continuously rotated by a small helix motor 16. The helix motor 16 may advantageously rotate the helix at about 80 revolutions per minute so that the helix rotates quickly in comparison to the lateral motion of the spray gun 17. The spray gun 17 is mounted rigidly by a gun carriage 18 which is driven, as by a drive screw 19 and gun carriage motor 20, in line with the helix axis.

Positioned in line with the helix axis and directly beneath the gun carriage 18 is a track 22 comprising a plurality of metal rollers or ridges 23 spaced evenly apart. In one specific embodiment of this invention, the rollers 23 were spaced a half-inch apart defining half-inch distance units; thus the stepped portions of the curve 13 of Fig. 3 were similarly a half-inch long. A microswitch 25 is supported by the gun carriage 18 and includes a depending arm 26 having a roller or wheel 27 at its end for motion along the track 22. Each time the wheel 27 passes over a roller 23 of the track 22, the arm 26 presses against a pin 28 causing the microswitch 25 to close. In this specific embodiment of the invention, a second microswitch 29 is positioned rigidly along the track 22 and has a pin 30 which is depressed by the side of the carriage 18. These two microswitches 25 and 29 enable a controller circuit, described further below, to keep continuous track of the location of the spray gun 17 during the spraying sequence and to control the direction of the carriage 18 in accordance with the desired pattern.

When the power supply is turned on by the main control key M, the helix motor 16 starts to turn the helix 10, a solenoid 33 is energized and allows compressed air to pass through tubing 34 to operate the spray gun 17, and the carriage motor 20 starts to move the carriage 18, and thus the spray gun 17, along the helix 10; we are ignoring for the moment the timing control 36 and timing motor 37. If we assume that the motion of the carriage 18 is initially towards the left, the carriage will continue in motion until it depresses the pin 30 thereby closing the microswitch 29. This applies a signal, which may advantageously be either a ground or a voltage, to a director circuit 39 which in turn reverses the carriage motor direction. At the same time the director will close a previously held open electric path between the microswitch 25 carried by the gun carriage 18 and a scanner circuit 40.

The gun carriage 18 will now travel towards the right and each time the wheel 27 of arm 26 moves over the rollers 23 on the track 22 the microswitch 25 is closed, having thus closed once for every unit distance of travel which in the specific embodiment being described is every half-inch. Each closing of the microswitch 25 applies a signal, which may advantageously be either a ground or a voltage, to the scanner circuit 40 which counts these signals. The scanner 40, as it counts, checks each signal and thereby checks each position of the gun carriage 18, against the pattern memory 41, which may advantageously be stored in a jack field as described further below. When the scanner 40 finds in the pattern memory 41 an indication commanding a reversal of direction of the spray gun, this information is sent back to the director 39 which immediately reverses the carriage motor direction and the sequence described above is again repeated. When the desired spray pattern has been completed, the scanner 40 may advantageously be made to find a special point in the pattern memory 41 which is connected to a stop relay 42. Operation of the stop relay 42 releases the solenoid 33 thereby shutting off the spray gun 17. The carriage 18 and the scanner 40, however, continue their motion until a final position in the pattern memory 41 is reached, at which point a final signal is transmitted to the director 39 to stop the carriage drive motor 20.

In one specific illustrative embodiment of this invention the pattern memory 41 may advantageously comprise a jack field, as shown in Fig. 5, having shorting plugs positioned in certain of the jacks to indicate the reversal of direction of the carriage motor 20. The specific pattern shown in Figs. 2 and 3 extends only between rollers 4 and 19, considering each roller 23 to be indicative of one half-inch unit in Figs. 2 and 3. It is therefore desirable that the spray gun 17 begin spraying the helix at the position indicated by roller 19 and travel to the left. The carriage will thus travel 15 units until the switch 29 is actuated when its direction will reverse. To attain the specific pattern shown in Fig. 3 the carriage 18 will then travel 14 units to the right, each unit being counted by the scanner 40 on reception of a ground signal from the switch 25, until the scanner 40 reaches a plug in the jack field which is 14 jacks removed from the start of the scanning. As the first two jacks, jacks numbered 0 and 1, advantageously have dummy plugs for reasons described subsequently, the scanning begins at jack number 2 and the first plug is thus at jack number 15. On the return to the left no jacks are counted by the scanner 40. When the carriage 18 again starts to travel to the right scanner 40 counts to the next plugged jack, which is jack number 28, which indicates that the carriage will have traveled 13 units to the right. By noting the positions of the plugs in the jack field and recalling that the jacks are counted by the scanner 40 only when the carriage 18 travels to the right in this specific embodiment, it can readily be seen that the travel of the carriage is in accordance with the following table:

| Distance traveled (in units) | No. of Passes over that distance | Jack No. at which reversal occurs |
| --- | --- | --- |
| 15 | 1 |  |
| 14 | 2 | 15 |
| 13 | 2 | 28 |
| 12 | 2 | 40 |
| 11 | 2 | 51 |
| 10 | 2 | 61 |
| 9 | 2 | 70 |
| 8 | 2 | 78 |
| 7 | 2 | 85 |
| 6 | 2 | 91 |
| 5 | 4 | 96 |
|  |  | 101 |
| 4 | 6 | 105 |
|  |  | 109 |
|  |  | 113 |
| 3 | 8 | 116 |
|  |  | 119 |
|  |  | 122 |
| 2 | 10 | 125 |
|  |  | 127 |
|  |  | 129 |
|  |  | 131 |
|  |  | 133 |
| 1 | 20 | 135 |
|  |  | 136 |
|  |  | 137 |
|  |  | 138 |
|  |  | 139 |
|  |  | 140 |
|  |  | 141 |
|  |  | 142 |
|  |  | 143 |
|  |  | 144 |
|  |  | 145 |
| Special Plug to Stop Relay |  | 146 |
| Final Carriage Position |  | 160 |

It may be noted that in this embodiment the final position of the carriage 18 is the initial position for the next spraying operation, i. e., at the position designated by unit, or roller, number 19.

While in this specific embodiment the director 39 disables the microswitch 25 so that the scanner only counts pulses during travel to the right, because of the straight character of the left side of the attenuation pattern 12 of Fig. 2, it is to be understood that a pattern could well be set up in the pattern memory, which in this embodiment is the jack field of Fig. 5, which would require the scanner 40 to count pulses in both directions.

As the ability of my novel apparatus to produce the desired attenuation pattern is in part dependent on the consistency with which the spray gun operates, it is desirable to test the gun prior to a spraying operation and to be able to test it during the operation, if desired. Therefore before starting a spraying operation the test key T is thrown after a slide has been inserted between the helix and the spray gun. When the test key T is thrown the solenoid activates the gun for a period of 30 seconds, as determined by the timing control circuit 36. The slide is then checked photometrically to assure that the nozzle has been adjusted to give unit spray. Since the nozzle of the spray gun may clog both when the sprayer is in use and when at rest, advantageously the timing control circuit 36 and timer motor 37 also operate to interrupt the spray for a fraction of a second once every 30 seconds by releasing the solenoid temporarily. This action causes the spray gun plunger to release and thereby to clean the gun nozzle of any deposit formed during the previous 30 seconds. If for any reason it is desired to make a check on the unit spray during a spraying operation, the main key M may be released and a spray test made identical to that advantageously made prior to commencing the spraying operation. Upon satisfactory readjustment of the spray, if found necessary, the main switch M is closed again and the carriage 18 as well as the scanner 40 continue automatically from where they were stopped.

Turning now to Figs. 6 and 7 there is shown a schematic representation of the specific illustrative embodiment of this invention described above. When a helix is to be sprayed by the apparatus of Figs. 6 and 7 all control keys are normally in their normal or off positions. The master key A will be closed first to apply power to the apparatus. The first step will normally be the test of the spray gun for unit spray, as described above. The test key T is therefore moved from its off position after the microscope slide has been inserted into a holder between the helix 10 and the spray gun 17. Power is then applied to the timing motor 37 which causes a cam 45 to rotate. Simultaneously a positive voltage is applied to relay T1, all direct current potentials being advantageously derived from the power source by a rectifier unit 46. Operation of relay T1 breaks three connections which are closed during the spraying process to prevent interference with the test, and cuts the W—Z relay combination, identified as WT—ZT, into the circuit, and applies a voltage to the cam activated contact 47 of a switch 48. Nothing further occurs until the timing motor 37 drives the cam 45 to the point where it causes transfer of the contacts of switch 48. A voltage is then applied for a short period of time to the WT—ZT relay pair, which causes the spray test to begin as power is then applied to the solenoid which, in operating, starts the spray.

The timing motor continues in its motion until the cam 45 again transfers the contact arm 41 of switch 48 and reapplies a voltage to the WT—ZT relay pair. This causes the WT relay to release, stopping the timing motor, and shutting off the solenoid controlled spray. The test key T is then restored to its normal position and, if the slide deposit is found to be within the preset limits when tested by a densitometer, the spray apparatus is ready to apply the attenuation to the helix 10.

To operate the spray apparatus the main switch M is closed thereby applying power to the helix motor 16, the gun carriage motor 20, and the solenoid 33. In the above-described embodiment initial energization of the carriage motor 20 causes the carriage 18 to move to the left. The switch 25 is of necessity closed by the locating rollers 23 of the track 22, but the scanner disregards this action since both the pattern key P and the W relay of the director 39 are released, as further described below. When the carriage has traveled the distance of the first pass, which as described above is 14 rollers or distance units, it contacts the pin 30 of microswitch 29 and a positive voltage is applied to the director 39 through the back contact 50 of the reset key R. This voltage applied to the director causes the W relay to operate. Transfer of the contacts 51 of the W relay reverses the direction of the carriage motor 20, closure of contacts 53 causes an indicating lamp 52 to light, closure of the contacts 54 of the W relay connects the microswitch 25 through to the scanner 40, and closure of the contacts 55 of the W relay applies a positive voltage to the W relay so that these contacts do not release when the microswitch 29 reopens as the carriage 18 moves to the right.

As the gun carriage moves to the right, each closure of the microswitch 25 due to the wheel 27 riding over a roller 23 causes a positive voltage to be applied to the U relay, which operates the wipers 57, 58 and 59 of a three layer 20 point rotary switch 60. Movement of wiper 59 applies a positive voltage in succession to each of the 20 leads of the connecting network and to one line of the jack field 41. The particular line being scanned is chosen by a ten point rotary switch 62 controlled by a relay D which receives a positive pulse from wiper 58 once for each twenty input pulses to relay U. Thus in the position shown rotary switch 62 applies a positive voltage through its 0 contact to the C0 relay so that the first line of the jack field, representing jacks zero through 19, is scanned. Subsequent rotation of the wiper of the rotary switch 62 will cause operation of relays C1, C2, etc., through C8 and C9.

The scanner will thus send a positive pulse, if we consider relay Y, described further below, as closed, to each of the jacks of the jack field 41 in succession. When the first shorting plug 64 is reached, at jack number 15 as seen in Fig. 5, the positive voltage from the wiper 59 is applied through the shorting plug 64, lead 65, and the closed contacts 66 of the W relay to the W—Z relay pair, causing the director to reverse the carriage motor direction once again and disabling the microswitch 25 from the scanner and the jack field.

In this manner each passage of the gun carriage to the right is counted by the scanner 40 and checked against the pattern memory in the jack field 41. When the desired pattern has been sprayed onto the helix 10, the scanner counts to the special shorting plug 68 which is connected by a separate lead to the stop relay S. Operation of relay S lights a second indicating lamp 70 to advise the operator that the spraying operation is now completed, closes contacts 69 to lock itself in the operated condition through the contacts of reset key R, opens the normally closed contacts 71 immediately interrupting the power to the solenoid 33 and thus shutting off the spray gun 17, and opening contacts 72 which apply power to the helix motor 16 and carriage motor 20. The motors 16 and 20 do not stop immediately, however, as they are still connected to the power source over the closed contacts 73 of relay W.

While the operation of the stop relay S has successfully removed the spray, the carriage 18 has continued its motion to the right. The scanner keeps track of this motion until the final shorting plug is reached at which point the director again receives a positive voltage, the W—Z relay combination is again reversed, and the contacts 73 are opened thereby turning off the helix and carriage motors. Then the operator may open the main key M and prepare the apparatus for its next operation by depressing the reset key R. Operation of the reset key R releases the stop relay S and removes the positive voltage from microswitch 25 to insure that relay U does not remain energized even if the wheel 27 should happen to have stopped on top of one of the locating rollers 23. Operation of the reset key R also applies a positive voltage to the relay R to reset the rotary relay 62 to zero so that, in preparation for the next spraying operation, relay C0 is again energized and jacks numbers zero through nineteen are connected to the common horizontal buses of the connecting network. Simultaneously a positive voltage is applied to the relay U through the wiper 51 and the contacts of that contact bank to cause the relay U to home until wiper 51 reaches the open one contact. As the wipers 57, 58 and 59 are all ganged together they are similarly returned to their one position. The D relay is advantageously slow operating so that the passage of wiper 58 past its zero contact during the homing operation will not affect the D relay. For this reason the homing returns the wipers to their one contacts rather than to their zero contacts, as that would cause relay D to operate. It can now be seen that jacks one and two are dummy jacks to enable contact one to be the rest position for wiper 59.

Operation of the relays E and Y, which comprise the pulse reducer 76 shown in Fig. 4, will now be explained. We have seen that the pattern memory must apply a command signal to the W relay whenever such is appropriate and that the circuit must be able to follow these commands even when the plugs are in adjacent jacks, i. e., when only a spray pass of one distance unit is wanted. However, since this motion of passing over the distance of one unit, i. e., between adjacent rollers 23, may occur very rapidly there may be no time during which the common jack lead 65 does not have a positive potential applied thereto. When that happens the W relay will remain operated and, in effect, will disregard the presence of the second plug.

The pulse reducer 76 avoids this possibility by shortening to a definite period the time during which the positive voltage is applied to the jacks. The pulse reducer comprises the relays E and Y, relay Y being a slow release relay. When microswitch 25 applies a positive voltage to relay U, a positive voltage is similarly applied to relay E causing relay Y to operate. The release of microswitch 25 releases both relays U and E causing the wiper 59 to advance to the next position. No positive voltage is applied to wiper 59 until relay E releases at which time the voltage is applied through its back contacts and the still closed front contacts of relay Y. This voltage will be passed onto the director, if the jack being scanned is plugged, as described above. About 100 to 200 milliseconds later the relay Y releases and removes this positive voltage, the period depending on the delay of the slow-release relay Y. This permits the director to recognize that the first command has been completed. During the next single count a similar sequence is repeated when the positive voltage is again applied to the stepping and pulse reducer relays. This insures that the relay W of the director will recognize each pulse of instruction from the pattern memory 41 as one entity.

It is to be understood that the above-described arrangements are illustrative of the application of the principles of the invention. Numerous other arrangements may be devised by those skilled in the art without departing from the spirit and scope of the invention.

What is claimed is:

1. Apparatus for spraying attenuation onto a traveling wave tube helix in a predetermined pattern comprising means for supporting and rotating said helix, a carriage, a spray gun supported by said carriage, means for moving said carriage in a line parallel to the axis of said helix, means for electrically indicating the position of said carriage along said line as said carriage moves, said indicating means comprising switching means and means for closing said switching means once for each predetermined distance of travel of said carriage along said line, means for counting the closures of said switching means, means for reversing the direction of said carriage when said counting means has counted up to a predetermined position of said carriage, means for finally interrupting the spray when the predetermined pattern has been sprayed onto said helix by successive reversals of said carriage, and means for stopping travel of said carriage on final interruption of said spray.

2. Apparatus in accordance with claim 1 comprising also means for periodically interrupting said spray to prevent clogging of said gun.

3. Apparatus in accordance with claim 1 comprising also means for resetting said counting means on final interruption of said spray to prepare said apparatus for the spraying of another helix.

4. Apparatus for spraying attenuation onto a traveling wave tube helix in a predetermined pattern comprising means for supporting and rotating said helix, a carriage, a spray gun supported by said carriage, means for moving said carriage in a line parallel to said helix, means for storing in the apparatus the attenuation pattern to be sprayed, means for electrically indicating the position of said carriage along said line as said carriage moves, means for comparing the position of said carriage as indicated by said indicating means with the pattern stored in said storing means, means for reversing the direction of said carriage when the position of said carriage as indicated by said indicating means coincides with a particular portion of said pattern stored in said storing means, means for finally interrupting the spray when the predetermined pattern has been sprayed onto said helix by successive reversals of said carriage, and means for stopping travel of said carriage on final interruption of said spray.

5. Apparatus for spraying attenuation onto a traveling wave tube helix in a predetermined pattern comprising means for supporting and rotating said helix, a carriage, a spray gun supported by said carriage, means for moving said carriage in a line parallel to said helix, means for electrically storing in the apparatus the particular attenuation pattern to be sprayed, means for electrically indicating the position of said carriage along said line as said carriage moves, said indicating means comprising switching means carried by said carriage and means closing said switching means once for each predetermined distance of travel along said line, means for counting the closures of said switching means, means for comparing the position of said carriage as indicated by said counting means with the pattern stored in said storing means, means for reversing the direction of said carriage when said counting means has counted up to a predetermined position of said carriage as stored in said pattern in said storing means, means for finally interrupting the spray when the predetermined pattern has been sprayed onto said helix by successive reversals of said carriage, and means stopping travel of said carriage on final interruption of said spray.

6. Apparatus in accordance with claim 5 comprising also means for resetting said counting means on final interruption of said spray to prepare said apparatus for the spraying of another helix.

7. Apparatus in accordance with claim 5 wherein said means closing said switching means once for each predetermined distance of travel along said line comprises a track positioned beneath said carriage and having a plurality of rollers equally spaced thereon and projecting above the plane of said track, an arm depending from said carriage, a wheel at the end of said arm riding along said track, and a pin projecting from said carriage and adapted to operate said switch, said arm bearing against said pin when said wheel rides over one of said rollers.

8. Apparatus in accordance with claim 5 wherein said counting means comprises a rotary stepping switch and said storing means comprises a jack field having shorting plugs positioned in certain of said jacks in accordance with said predetermined pattern, said comparing means checking each position of said stepping switch for the presence of a shorting plug in one of said jacks.

9. Apparatus for spraying attenuation onto a traveling wave tube helix in a predetermined pattern comprising means for supporting and rotating said helix, a carriage, a spray gun supported by said carriage, means for moving said carriage in a line parallel to said helix, a jack field, a plurality of shorting plugs in certain of said jacks in accordance with the particular pattern to be sprayed onto said helix, a track positioned beneath said carriage and having a plurality of rollers equally spaced thereon and projecting above the plane of said track, a switch carried by said carriage, an arm depending from said carriage, a wheel at the end of said arm and adapted to ride along said track, a pin projecting from said carriage and adapted to operate said switch, said arm bearing against said pin when said wheel rides over one of said rollers, a rotary stepping switch connected to said switch for advancement on each closure of said switch, a connecting network connecting said rotary stepping switch to each of said jacks, means for reversing the direction of said carriage when said rotary switch steps to a jack having a shorting plug therein, means for finally interrupting said spray when the predetermined pattern has been sprayed onto said helix by successive reversals of said carriage, and means for stopping the travel of said carriage on final interruption of said spray.

10. Apparatus in accordance with claim 9 comprising further means for periodically interrupting said spray to prevent clogging of said gun, said interrupting means comprising a timing motor, a cam connected to said motor for rotation thereby, and a switch adapted to be periodically operated by said cam.

11. Apparatus in accordance with claim 9 comprising also means for resetting said rotary stepping switch on final interruption of said spray to prepare said apparatus for the spraying of another helix.

12. Apparatus for spraying material onto an elongated member in a predetermined pattern comprising means for supporting and rotating said member, a carriage, a spray gun supported by said carriage, means for moving said carriage in a line parallel to the axis of said elongated member, means for electrically indicating the position of said carriage along said line as said carriage moves, said indicating means comprising switching means carried by said carriage and means for closing said switching means once for each predetermined distance of travel of said carriage along said line, means for counting the closures of said switching means, means for reversing the direction of said carriage when said counting means has counted up to a predetermined position of said carriage, means for finally interrupting the spray when the predetermined pattern has been sprayed onto said member by successive reversals of said carriage, and means for stopping travel of said carriage on final interruption of said spray.

13. Apparatus in accordance with claim 12 wherein said means closing said switching means once for each predetermined distance of travel along said line comprises a track positioned beneath said carriage and having a plurality of rollers equally spaced thereon and projecting above the plane of said track, an arm depending from said carriage, a wheel at the end of said arm riding along said track, and a pin projecting from said carriage and adapted to operate said switch, said arm bearing against said pin when said wheel rides over one of said rollers.

14. Apparatus in accordance with claim 12 comprising also means for electrically storing in the apparatus the particular pattern to be sprayed and means for comparing the position of said carriage as indicated by said counting means with the pattern stored in said storing means.

15. Apparatus for spraying material onto an elongated member in a predetermined pattern comprising means for supporting and rotating said elongated member, a carriage, a spray gun supported by said carriage, means for moving said carriage in a line parallel to the axis of said elongated member, a jack field, a plurality of shorting plugs in certain of said jacks in accordance with the particular pattern to be sprayed onto said elongated body, a track positioned beneath said carriage and having a plurality of spacing means equally spaced thereon, a switch carried by said carriage, means carried by said carriage and cooperating with said spacing means to close said switch once for each of said spacing means, a rotary stepping switch connected to said switch for advancement on each closure of said switch, a connecting network connecting said rotary stepping switch to each of said jacks, means for reversing the direction of said carriage when said rotary switch steps to a jack having a shorting plug therein, means for finally interrupting said spray when the predetermined pattern has been sprayed onto said helix by successive reversals of said carriage, and means for stopping travel of said carriage on final interruption of said spray.

HERBERT A. SCHNEIDER.

No references cited.